March 13, 1934.　　　J. R. BURCH　　　1,950,385
ELECTRICAL GRIDDLE OR COOKER
Filed Nov. 9, 1931　　　2 Sheets-Sheet 1
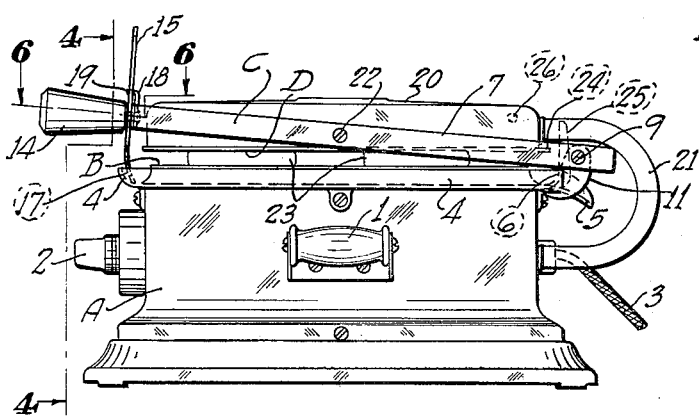
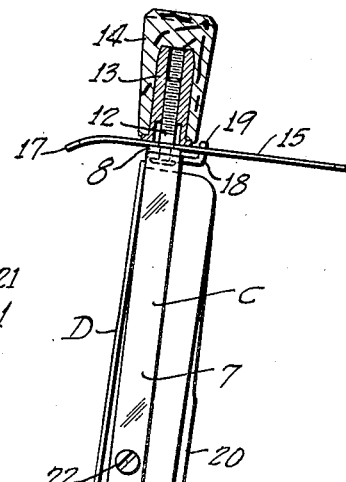
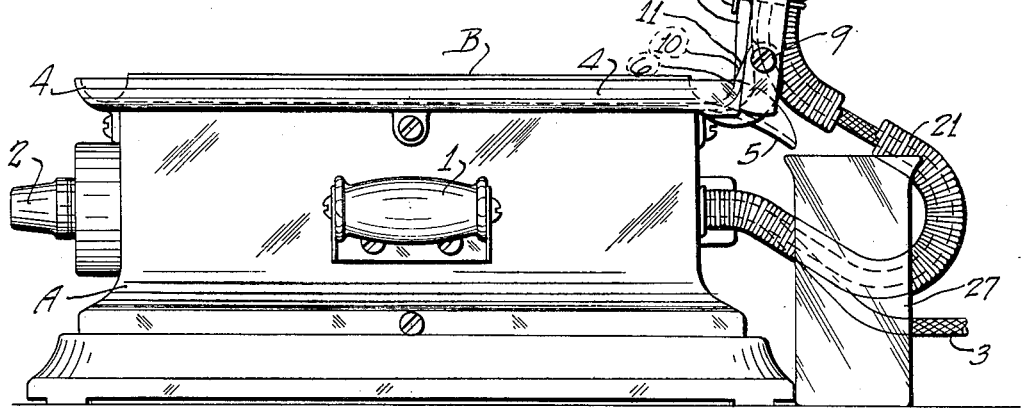
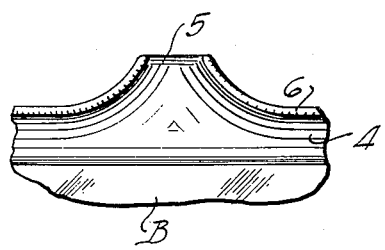
INVENTOR
Julian R. Burch.
By *Ralph Kalish*
ATTORNEY March 13, 1934.  J. R. BURCH  1,950,385
ELECTRICAL GRIDDLE OR COOKER
Filed Nov. 9, 1931   2 Sheets-Sheet 2
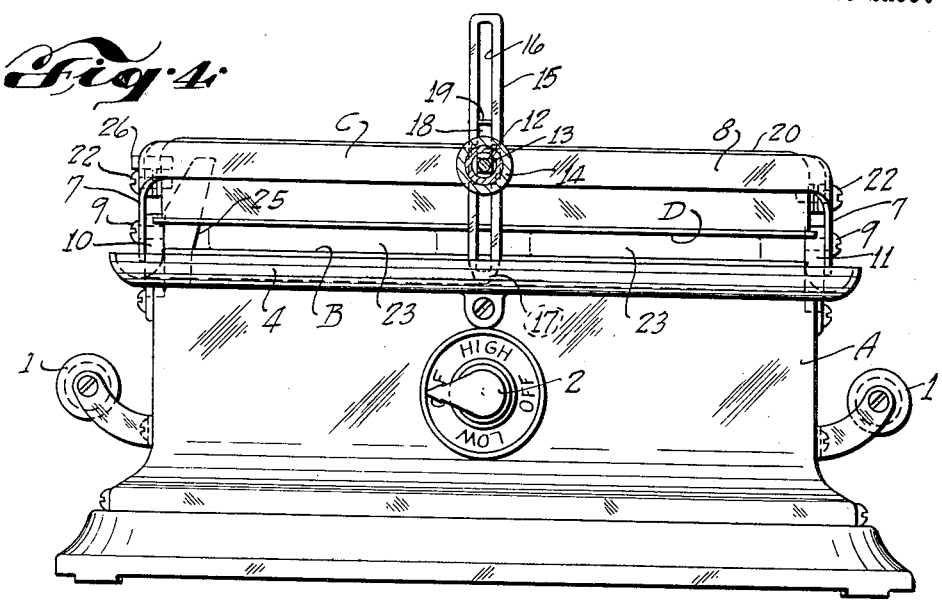
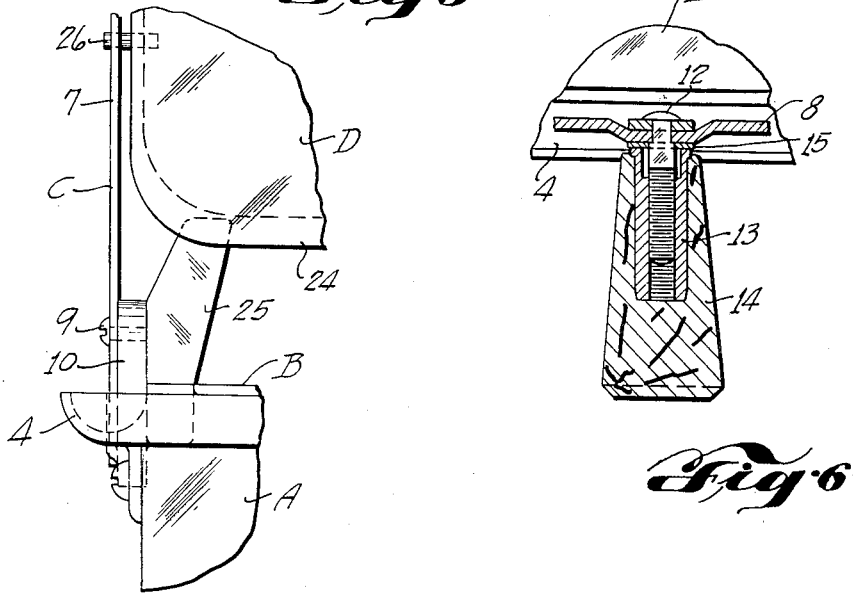
INVENTOR
Julian R. Burch.
By Ralph Nelish
ATTORNEY Patented Mar. 13, 1934

1,950,385

UNITED STATES PATENT OFFICE 1,950,385

ELECTRICAL GRIDDLE OR COOKER

Julian R. Burch, St. Louis, Mo.

Application November 9, 1931, Serial No. 573,927

2 Claims. (Cl. 53—5)

This invention relates generally to electrical cooking appliances. More particularly, my invention has reference to electrically heated griddles for cooking food-articles on two sides at the same time, such griddles including co-operatively superimposed griddle-sections for applying cooking heat to opposite sides of food-articles disposed therebetween.

My invention has for its prime object the provision, in a griddle or cooker of the type described, of readily manipulated means for efficiently relieving the weight of the upper griddle adjustably from and suitably to the thickness of the article being cooked, while also providing the requisite heating contact between the griddle and the food article.

My invention has for another object the provision in a two-part griddle as described of means for drawing grease or drippings from the griddle-sections, particularly the drippings from the upper section when the latter is in uplifted non-cooking position widely spaced from the lower griddle-section.

And with the above and other objects in view, my invention resides in the novel features of form, construction, arrangement, and combination of parts hereinafter described and pointed out in the claims.

In the accompanying drawings (two sheets),—

Figure 1 is a side elevational view of a griddle or cooker of my invention, the upper griddle-section being closed in cooking or toasting position upon the lower section with a food-article disposed therebetween;

Figure 2 is an enlarged side elevational view, partly broken away and in section, of the griddle, the upper section being in uplifted non-cooking position widely spaced from the lower-section, the food-article being removed, and a grease receptacle disposed in the rear of the griddle;

Figure 3 is a fragmentary detail plan view showing the grease gutter-spout of the lower griddle-section;

Figure 4 is an enlarged front elevational view, partly in section, of the griddle, taken approximately along the line 4—4, Figure 1;

Figure 5 is an enlarged fragmentary detail view of a portion of the upper griddle-section and the co-operating griddle-stop carried by the lower-griddle-section, a portion of the bail being shown and other parts broken away; and Figure 6 is a fragmentary sectional view of the bail-handle, taken approximately along the line 6—6, Figure 4.

Referring now more in detail and by reference characters to the drawings, which illustrate a preferred embodiment of my invention, A designates a base or shell provided, for convenient portability, with carrying-handles 1. The base A has preferably the rectangular form or contour shown and contains or houses the usual electrical apparatus including a switch 2 disposed accessibly on the front wall of the base for controlling the supply of current for heating the griddle, a suitable electrical conductor or cable 3 leading from the base A for connection with a suitable source of current supply (not shown).

Supported on the base A, is a griddle-section B having preferably a flat or plane rectangular upwardly presented cooking surface, the griddle section B containing suitable heating elements (not shown) actuable by current controlled by the switch 2. Marginally bounding the griddle B, is a grease collecting means or gutter 4 having generally a rearward slope for draining grease from the griddle B to a spout 5 provided preferably in the rear wall 6 of the gutter 4 (Figure 3).

C designates a U-shaped frame or bail, which includes spaced parallel side bars 7 and a connecting front bar 8. The side bars 7 at their respective rear ends are hinged or pivoted, as at 9, to the respective brackets 10, 11, projecting rearwardly and upwardly from the opposite rear corners of the lower griddle-section B, for swingably supporting the bail C for actuation thereof over the griddle B for a purpose presently appearing.

Forwardly projecting intermediately from the front bar 8, is a stud 12, on which is threaded an elongated nut 13 provided with a surrounding handle 14. Disposed for movement intermediate the nut 13 and the bar 8, is a slide-bar 15 having a longitudinal slot 16 for working over the stud 12, the slide-bar 15 being provided at one end with a foot 17 for disposition in the subjacent front channel of the gutter 4 when the bail C is swung forwardly over the griddle B. A lug 18 projecting upwardly from the front bar 8 has a suitable finger 19 engaging the slot 16 for guiding the slide-bar 15 for vertical movement thereof on the bail C.

D designates a second or upper griddle section having preferably a flat or plane rectangular downwardly presented cooking surface complementary to, and co-operable for food-cooking purposes with, the griddle-section B. The griddle D includes a shell or housing 20 also containing suitable heating elements (not shown) actuable also by current controlled by the switch 2, a suitable armored flexible cable 21 for such purpose leading from the base A to the griddle D, as best seen in Figure 1.

Projecting intermediately from the opposite sides of the griddle D, is a pair of registering or aligning pintles 22 having engagement with the respective bail side bars 7 for pivotally supporting the griddle D in approximately balanced condition in the bail C for shiftable manipulation of the griddle D swingably towards and from the griddle B.

On suitable manipulation of the nut 13 by means of its carried handle 14, the slide-bar 15 may be clamped in adjusted position on the bail C, whereby, as the bail C is swung forwardly over the griddle B for engaging the slide-foot 17 with the channel of the gutter 4, the front end of the bail C will be thus supported at a suitable or desired elevation above the griddle B. In such manner, the bail-carried griddle D may be spaced from the sub-disposed griddle B suitably for the purpose of engaging the food-articles, as 23, in heat-imparting relationship therebetween, while relieving from such food-articles 23 the weight of the griddle D, the latter, however, being readily shiftable upwardly responsively to expansion, if any, of the article being cooked.

The griddle D is provided along its rear margin with a projecting drip-flange 24, and a stop or lug 25 projects upwardly from the rear gutter wall 6 adjacent the bracket 10, with which in part the stop 25 is preferably integrally formed, for impingement thereof by the top-face of the drip-flange 24 of the griddle D when the latter is swung to vertical uplifted rear position for oscillating the griddle D in the frame C and then retaining the same in upright position for registration of the drip-flange 24 with the rear channel of the gutter 4, as best seen in Figure 2.

Disposed adjacent the rear margin of the griddle D and laterally projecting from one side of the housing 20, is a pin 26 for impinging the normally top margin of the adjacent bail-side bar 7 as the drip-flange 24 likewise impinges the stop 25 for retaining the bail C and its carried griddle D, in co-operation with the stop 25, in rearwardly inclined uplifted position suitably for draining grease or drippings from the griddle D into the gutter 4. In such manner, the grease from both griddles drains into the gutter 4 and overflows through the spout 5 most conveniently into a suitable cup or receptacle 27 provided for the purpose, as shown in Figure 2.

In use and operation, it will be seen that the adjustment of the slide-bar 15 may be effected with ease and facility at any stage of the cooking operation by simply with one hand manipulating the handle 14 and its carried nut 13 and with the other hand shifting the bar 15 on the bail C to the desired or necessary degree for applying cooking heat to the opposite sides of the food-article, while at the same time relieving the interposed food-article of the weight of the oscillatory upper section D for preventing deformation of the food-article between the griddle-sections, the upper section D pivotally automatically taking a cooking position flatwise over the interposed food article.

It will be further seen that the co-action of the stop 25 and pin 26 with the drip-flange 24 and the bail C is such as to insure the registration of the food-engaging face of the upper griddle-section D with the grease-gutter 4 at all times or whenever there is likelihood of grease dripping from the griddle D, thus preventing unhygienic and unsanitary spillage of the grease in other places than into the gutter 4.

My new griddle or cooker may be readily manufactured, is compact and durable, and is exceedingly efficient in the performance of its intended functions, cooking, toasting, roasting, or grilling the food-article on both sides at the same time.

It will be understood that changes and modifications in the form, construction, arrangement, and combination of the several parts of the griddle or cooker may be made and substituted for those herein shown and described without departing from the nature and principle of my invention.

Having thus described my invention, what I claim and desire to secure by Letters Patent is,—

1. In a griddle for simultaneously cooking opposite sides of a food-article, in combination, upper and lower griddle-sections for engaging the food-article therebetween, bail-means for hingedly connecting the griddle sections for swingable movement one upon the other, and means including a slide shiftably mounted on the bail and a bail-handle having clamping co-operation with the slide for adjustably supporting one of the griddle-sections in spaced cooking relation with the other section.

2. In a griddle for simultaneously cooking opposite sides of a food-article, in combination, co-operable griddle-sections for engaging the food article therebetween, a bail having hinged connection with one of the sections for supporting the other section for swingable movement of said one section upon the other, and means including a handle threaded to the bail and a slotted member grippingly engaged between the handle and the bail for engaging the bail-connected griddle-section for spacing the griddle-sections adjustably apart for preventing deformation of the food-article therebetween.

JULIAN R. BURCH.